United States Patent [19]
Ingre et al.

[11] Patent Number: 5,317,560
[45] Date of Patent: May 31, 1994

[54] STAR DATA NETWORK WITH LOGICAL RING FUNCTION PREFERABLY USING TOKEN ACCESS

[75] Inventors: Lars Ingre, Huddinge; Svante Axling, Älvsjö; Per-Ove Johansson, Stockholm, all of Sweden

[73] Assignee: Joing Invest AB, Huddinge, Sweden

[21] Appl. No.: 582,941

[22] PCT Filed: Feb. 26, 1990

[86] PCT No.: PCT/SE90/00131
§ 371 Date: Aug. 21, 1991
§ 102(e) Date: Aug. 21, 1991

[87] PCT Pub. No.: WO90/10345
PCT Pub. Date: Sep. 7, 1990

[30] Foreign Application Priority Data
Feb. 27, 1989 [SE] Sweden .................... 8900674

[51] Int. Cl.$^5$ ........................... H04L 12/44
[52] U.S. Cl. ...................... 370/16; 370/85.4; 370/94.3
[58] Field of Search ............... 455/78, 79; 370/32, 370/85.1, 85.13, 85.14, 56, 85.3, 85.4, 85.5, 85.15, 13, 16, 16.1, 94.1, 94.2, 94.3

[56] References Cited
U.S. PATENT DOCUMENTS

| | | | |
|---|---|---|---|
| 4,270,214 | 5/1981 | Davis et al. | 370/32 |
| 4,384,363 | 5/1983 | Lipcon | 455/78 |
| 4,481,641 | 11/1984 | Gable et al. | 455/78 |

Primary Examiner—Wellington Chin
Attorney, Agent, or Firm—Jacobson, Price, Holman & Stern

[57] ABSTRACT

Star data network with logical ring function preferably utilizing token access, including a line concentrator with a plurality of bypass switches each arranged for its respective link in a node in the data network. Each bypass switch in the concentrators is provided with a preferably active signal processing element adapted on one signal side for superimposing an incoming and outgoing signal on the same transmission line in the link and on its other side for smoothing out the incoming signals contribution to the outgoing signal, and in that the transmission line in the link is connected to the node via a preferably passive signal processing element with a function corresponding of the function of the preferably active signal processing element, the transmission line preferably being a coaxial cable installed in an earlier terminal network.

5 Claims, 3 Drawing Sheets

STAR DATA NETWORK WITH LOGICAL RING FUNCTION PREFERABLY USING TOKEN ACCESS

TECHNICAL FIELD

The invention relates to a star data network with logical ring function preferably utilizing token access.

BACKGROUND ART

Star data networks with logical ring function utilizing token access have been well known for ten years. An exhaustive description of the concept and its realization with the aid of line concentrators was published in 1983 in IBM systems Journal vol 22, nos 1/2, by R. C. Dixon, N. C. Strole and J. D. Markow.

Embodiments known up to now of data network with logical ring function usually have the disadvantage of requiring new lines for achieving satisfactory function. This means that large earlier investments in terminal networks with coaxial cables cannot be utilized in such embodiments.

DISCLOSURE OF THE INVENTION

The invention relates to a star data network with token access realized in such a way that use can be made of earlier investments in terminal networks with coaxial cables.

In addition, the invention enables the utilization of simpler and less voluminous connector means than what is indicated in the specification ISO/DIS 8802/5 for data networks according to the above.

In accordance with the invention this is achieved by a conventional line concentrator, with a plurality of bypass switching means each arranged for its respective link to a node in the data network, having each of the mentioned bypass switching means provided with a preferably active signal processing means disposed such as to superimpose on one signal side an incoming and an outgoing signal on the same transmission line in said link, and on its other signal side to smooth the incoming signal's contribution to the outgoing signal, and in that said transmission line in said link is connected to said node via a preferably passive signal processing means with a function corresponding to the function of said preferably active signal processing means, said transmission line preferably comprising a coaxial cable installed in an earlier terminal network. In a preferred embodiment in accordance with the invention of the preferably active signal processing means, the latter includes an amplifying comparator with a reference input adapted for having supplied to it the incoming signal via a first attenuation circuit and with a signal input connected to said transmission line, which is adapted for being supplied with the incoming signal via a second attenuation circuit corresponding to the first attenuation circuit.

BEST MODE OF CARRYING OUT THE INVENTION

Figure 1:
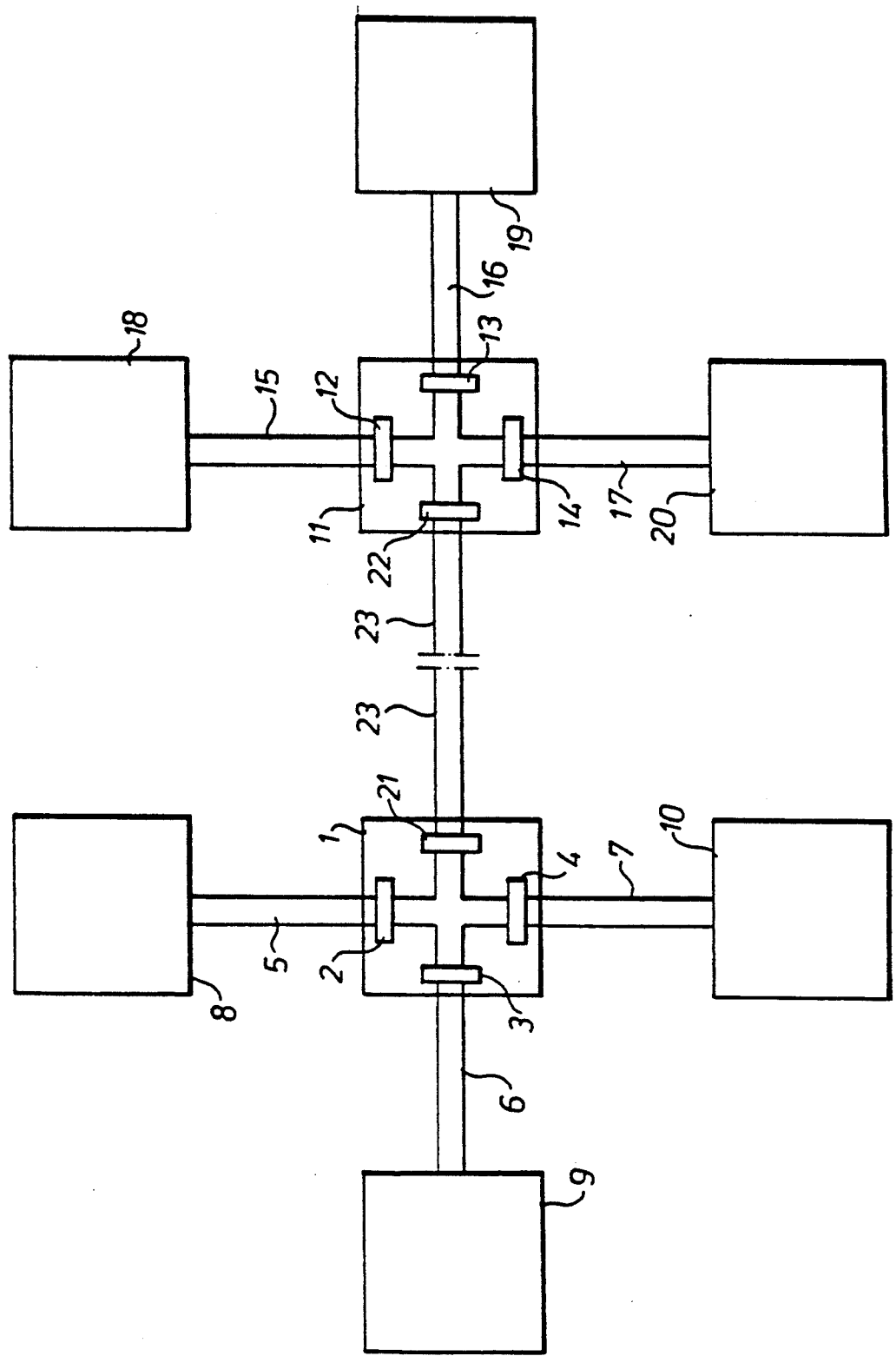
FIG. 1 is a block diagram of a star data network with logical ring function.

FIG. 1 is a block diagram illustrating a conventional star data network with logical ring function, including a first line concentrator 1 having, according to the example, three bypass switching means 2, 3, and 4 each arranged for a link 5, 6 and 7 to nodes 8, 9 and 10, and a second line concentrator 11 with bypass switching means 12, 13 and 14 each arranged for links 15, 16 and 17 to nodes 18, 19 and 20 in the data network. The two line concentrators are connected together by a link 23 and bypass switching means 21 and 22.

A more detailed description of the function of the data network in FIG. 1, utilizing token access is published in IBM Systems Journal vol 22, nos 1/2, 1983 by R. C. Dixon, N. C. Strole and J. D. Markov.

Embodiments known so far of data networks with logical ring function utilizing token access have the disadvantage of requiring new lines for achieving satisfactory function. The specification IEEE 802.5 / ISO/DIS 8802/5 has been prepared for ensuring the function.

In accordance with the invention, satisfactory function in the data network according to FIG. 1 and compatibility with the above mentioned specification IEE 802.5 / ISO/DIS 8802/5 can be achieved while making use of earlier investments in terminal networks with coaxial cable with the aid of the following arrangement: the combination that each of the mentioned bypass switching means 2, 3, 3, 12, 13 and 14 in the mentioned line concentrators 1 and 11 is provided with a preferably active signal processing means arranged on one signal side to superimpose an incoming and an outgoing signal on the same transmission line in said link, and on its other signal side to smooth the incoming signal's contribution to the outgoing signal, and that said transmission line in said link is connected to said node via a preferably passive signal processing means with a function corresponding to the function of said preferably active signal processing means, said transmission line preferably being a coaxial cable installed in an earlier terminal network.

Figure 2:
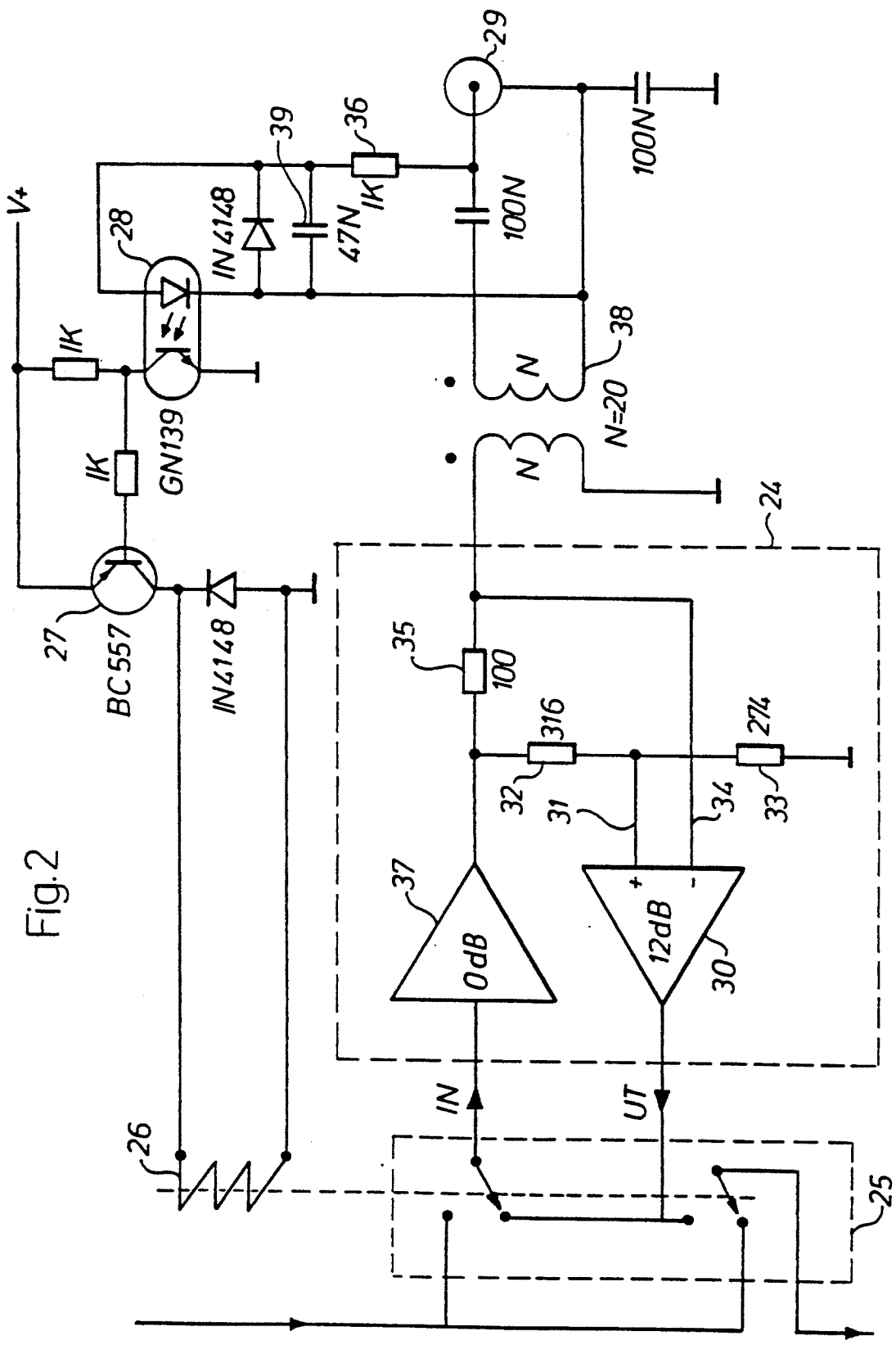
FIGS. 2 and 3 are circuit diagrams of preferred embodiments in accordance with the invention of an active and passive signal processing means, respectively.

FIG. 2 is a circuit diagram of a preferred embodiment in accordance with the invention of said preferably active signal processing means 24 in said line concentrators 1 and 11, said bypass switching means including a contact means 25 operated by a relay coil 26 driven by a transistor step 27 via an optocoupler 28 from a coaxial line 29 connected to one of said nodes in the data network.

The signal processing means 24 is connected for signalling to the coaxial cable 29 via a wideband transformer 38. The chief function of the transformer is to heavily supress longitudinal interference possibly occurring in the coaxial network.

Figure 3:
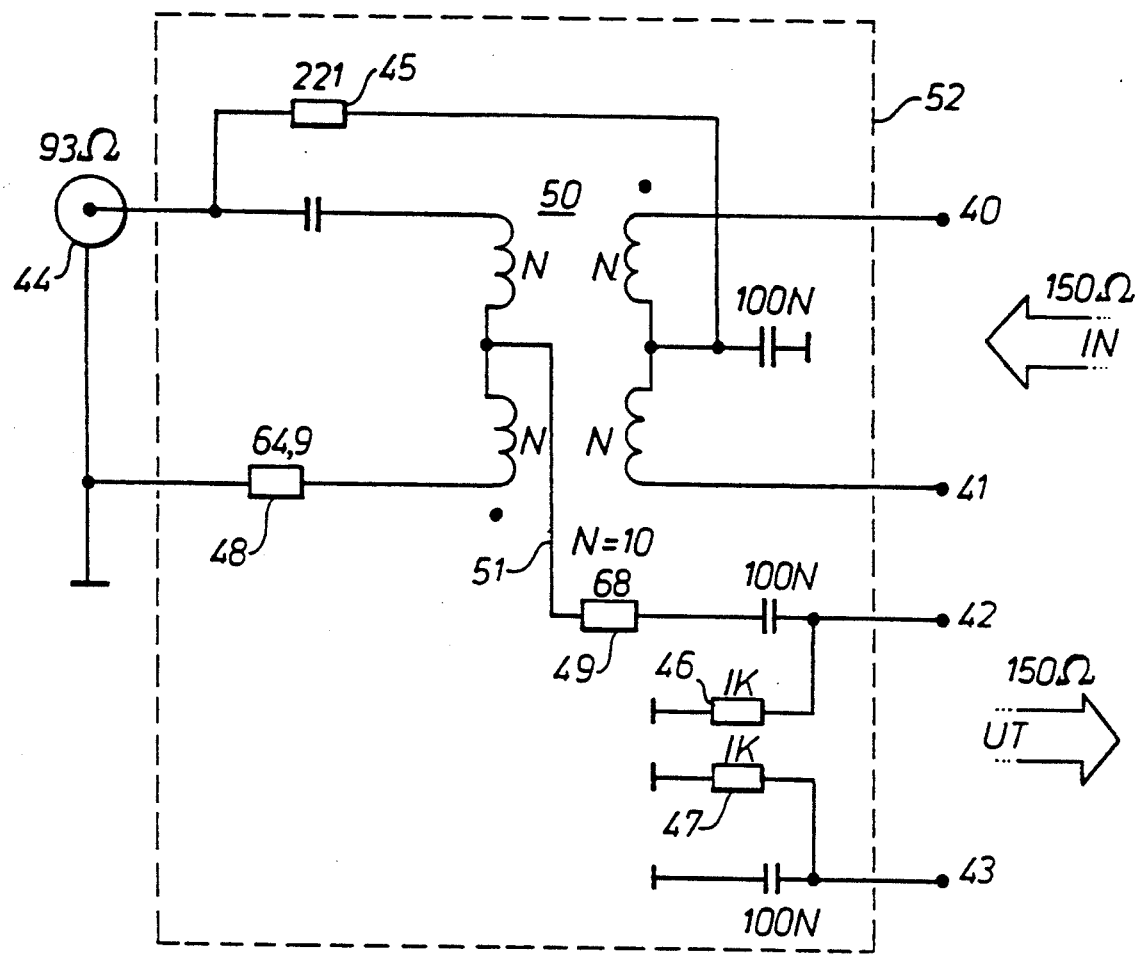

Operation of the respective bypass switching means 25 takes place with the aid of a direct voltage generated at the respective node in the coaxial network, see FIG. 3. The bypass switching means is activated by the node sending a positive signal on the input 40, 41 relative the output 42, 43. The direct voltage is applied to the coaxial cable 44 via the resistors 45, 46 and 47. In order to detect the direct voltage at the other end of the link, see FIG. 2, independent of possible longitudinal interference, an optocoupler 28 is used, connected in series with a resistor 36 to the incoming coaxial cable 29. The direct voltage activates the optocoupler 28, the output of which drives the transistor step 27, which gives the necessary drive current to the relay winding 26, which causes the relay contacts 25 to switch. The series resistor 36, which is grounded via the capacitor 39 for signalling, reduces the action of the optocoupler on the impedance at the coaxial interface.

The impedances in the coaxial contacts 29 and 44 must be adjusted to the characteristic impedance (in this case 93 ohms) of the coaxial cable so that the signal quality is not deteriorated by reflections at the end points of the link. In FIG. 2, the buffer amplifier 37 has a low output impedance, while the amplifier 30 has high input impedance. The impedance at the coaxial interface 29, within the frequency band in question, mainly comprises the sum of the resistance 35 and the buffer amplifier output impedance in parallel with the resistance 36, which gives good adaptability to 93 ohms. Corresponding impedance adjustment is necessary at the other end of the respective link and is provided by the passive signal processing means according to FIG. 3, with the aid of the resistors 45, 46, 48 and 49 in combination with the impedances which are connected between 40 and 41 and 42 and 43, respectively, being 150 ohms.

Separation of the input and output signals superimposed in the coaxial contact 29 takes place, as illustrated in FIG. 2, with the aid of the comparing amplifier 30, which can suitably be implemented as a differential step with the voltage gain 12 dB. The incoming signal is applied to the amplifier 30 via a first attenuation circuit 32, 33 and also via a second attenuation circuit, which comprises the resistor 35 in series with an impedance comprising that of the coaxial cable (93 ohms) in parallel with the resistor 36. By selecting the attenuation the same in these two circuits the incoming signal will give rise to an equally as great signal on both inputs 31 and 34, and thus will not give any contribution to the output signal. In FIG. 3 the separation of both superimposed signals takes place with the aid of passive components. The input signal is allowed to pass the wideband transformer 50 and is subsequently divided up into two equally as large impedances, of which one is the coaxial cable impedance (93 ohms) in parallel with the resistor 45, and the other is the resistor 48. Due to the symmetric implementation it will be understood that the input signal will not give any contribution at the central output 51 of the transformer, the output 42 being connected to this central output 51. The resistor 49 has the task of improving adaption to the output 42, 43.

The inversion of the output signal which the amplifier 30 causes is righted for each link by the corresponding inversion in the windeband transformer 50 of the incoming signal in the passive signal processing means at the other end of the link.

Figure 4:
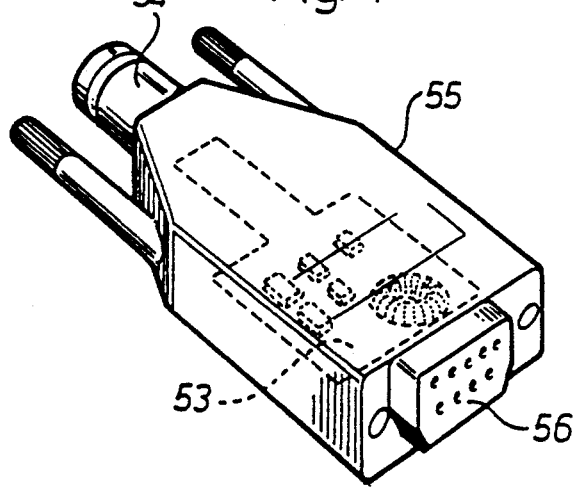
FIG. 4 is a perspective view of a preferred embodiment of an adapter in accordance with the invention, in which the passive signal processing means according to FIG. 3 is included.

FIG. 4 illustrates a mechnical implementation where the passive signal processing means 53 has been fitted into a standard screening casing 55 of a 9-pole D-sub device 56 and where the coaxial connection takes place directly to a BNC-contact 54 mounted in the screening casing.

We claim:

1. Star data network with logical ring function utilizing token access, including line concentrators with a plurality of bypass switching means each arranged for a corresponding link to a node in the data network, wherein each of said links comprises at least one transmission line, and wherein each of said bypass switching means is provided with an active signal processing means having first and second signal sides, said active signal processing means being adapted for superimposing on said first signal side a first incoming and a first outgoing signal on a single transmission line in said corresponding link, and on said second signal side for smoothing out a second incoming signal's contribution to a second outgoing signal, said first incoming and first outgoing signals on said first signal side corresponding to said second outgoing and second incoming signals on said second signal side, respectively, said single transmission line in said corresponding link being connected to said node via another signal processing means with a function corresponding to the function of said active signal processing means.

2. A data network as claimed in claim 1, wherein said bypass switching means is adapted for operation with the aid of an electric signal from said node over said at least one transmission line of said link.

3. A star data network as claimed in claim 1, wherein said active signal processing means includes an amplifying comparison means with an output for said second outgoing signal on said second signal side, with a reference input to which is supplied said second incoming signal on said second signal side via a first attenuation circuit, and with a signal input connected to said single transmission line, the single transmission line being arranged on said first signal side for supplying to said signal input said first incoming signal via a second attenuation circuit which is matched to provide substantially the same attenuation as said first attenuation circuit so as to smooth out said second incoming signal's contribution to said second outgoing signal on said second signal side.

4. A star data network as claimed in claim 1, wherein said at least one transmission line comprises a coaxial cable installed in an earlier terminal network.

5. A star data network as claimed in claim 1, wherein said other signal processing means comprises a passive signal processing means.

* * * * *